Sept. 29, 1964

W. H. CARRIGAN ETAL 3,150,563

DOUBLE PISTON WELDING CYLINDER

Filed June 14, 1961

INVENTORS
WILLIAM H. CARRIGAN
KENNETH R. BLANDING
BY DONALD E. BROUWER

ATTORNEYS

Sept. 29, 1964 W. H. CARRIGAN ETAL 3,150,563
DOUBLE PISTON WELDING CYLINDER
Filed June 14, 1961 2 Sheets-Sheet 2
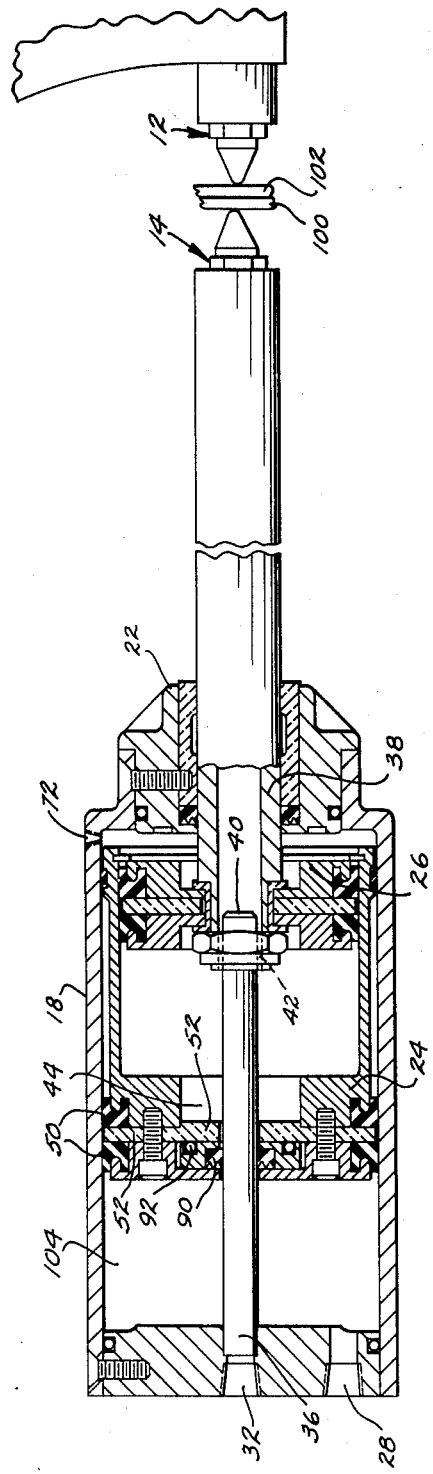
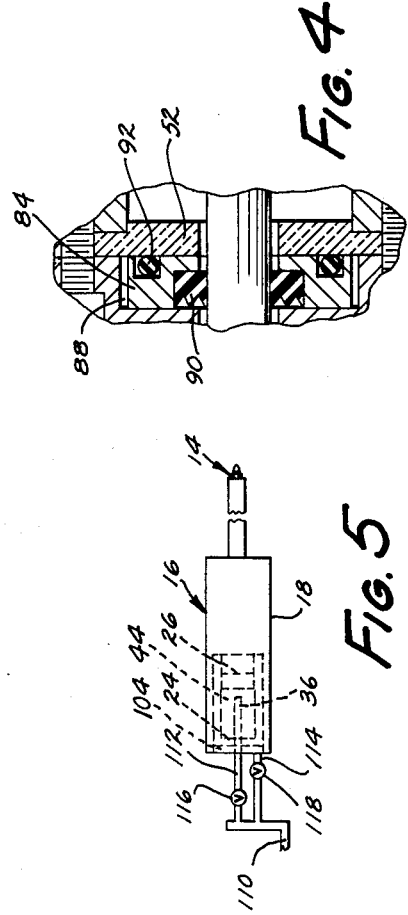
INVENTORS
WILLIAM H. CARRIGAN
KENNETH R. BLANDING
BY DONALD E. BROUWER
ATTORNEYS

United States Patent Office 3,150,563
Patented Sept. 29, 1964

3,150,563
DOUBLE PISTON WELDING CYLINDER
William H. Carrigan, Grand Rapids, Kenneth R. Blanding, Cedar Springs, and Donald E. Brouwer, Grand Rapids, Mich., assignors to Kirkhof Manufacturing Corporation, Grand Rapids, Mich., a corporation of Michigan
Filed June 14, 1961, Ser. No. 117,127
4 Claims. (Cl. 91—167)

This invention relates to welding apparatus and more particularly to a double piston power cylinder for resistance welding.

In high-speed resistance welding assembly operations, double piston fluid-actuated power cylinders are very useful for progressively closing the gap between the welding tips by virtue of partial closure with one piston after spanning a bulky portion of an item to be welded, followed by repetitive and rapid closing of the remaining gap with the second piston to cause a series of resistant welds. Optimum performance requires the front, secondly acting piston to be placed within a special section of the rearmost piston. Pressurized fluid is supplied to the rear piston chamber for its actuation. It is also supplied to the front piston chamber through a conduit attached to the cylinder and extending through the center of the rear piston.

Since during operation of the motor, the rear piston must reciprocate over the slide along this fixed conduit, it has been customary to provide packing between the rear piston and the conduit to diminish leakage of pressurized fluid from the rear piston chamber to the front piston chamber, or vice versa. However, to obtain a completely tight seal at this juncture is practically impossible using prior art structures due to the usual misalignment, occurring under production conditions, between the outer piston and the cylinder walls, or between the cylinder and the fixed conduit, or due to the tendency of the entire piston and shaft assembly to be slightly askew with respect to the cylinder.

Many disadvantages result wholly or partially from this leakage factor between the rear piston chamber and the front piston chamber. Illustrative of these are, frequent down time for seal replacement; inaccurate spacing of reciprocating and contacting electrode tips; lack of accurate control over welding tip contact pressure; and the necessity for two entirely independent pressure systems to operate the two pistons so that a lower pressure may be supplied to the front piston in order to prevent retraction of the rear piston while operating the front one.

Therefore, it is an object of this invention to provide a fluid motor wherein no leakage occurs adjacent the conduit which extends through the piston, and to provide a double piston fluid motor for use especially with resistance welders and the like wherein leak-proof sealing means are provided around a conduit extending through the first piston to supply fluid to the second piston, and thereby to effectuate long seal life, accurate electrode tip spacing control, accurate electrode tip pressure control, and the use of one pressurized fluid source and simple adjoining supply lines for operation of both pistons.

These and other objects and advantages will be apparent from a scrutiny of the following specification when studied in conjunction with the drawings in which:

FIG. 3 is a sectional view of the motor in the fully extended position with both pistons independently actuated;

FIG. 4 is a fragmentary enlarged sectional view of the sealing gland in the motor of the previous figures; and FIG. 5 is a schematic view of the double piston cylinder including the novel sealing means with the fluid supply lines.

Basically, the invention comprises a novel sealing structure between a reciprocating piston of a fluid motor, especially a double piston fluid motor in which the rear piston also forms a cylinder for the second and front piston, and a stationary conduit extending through the piston. The gland comprises a rigid annular member encircling the conduit tubing, having an annular recess in its inner peripheral face, and having an annular recess in at least one axial face thereof. Resilient sealing means are placed in these recesses to provide a sliding axial seal against the tubing and a radial sliding seal against the piston.

Figure 1:
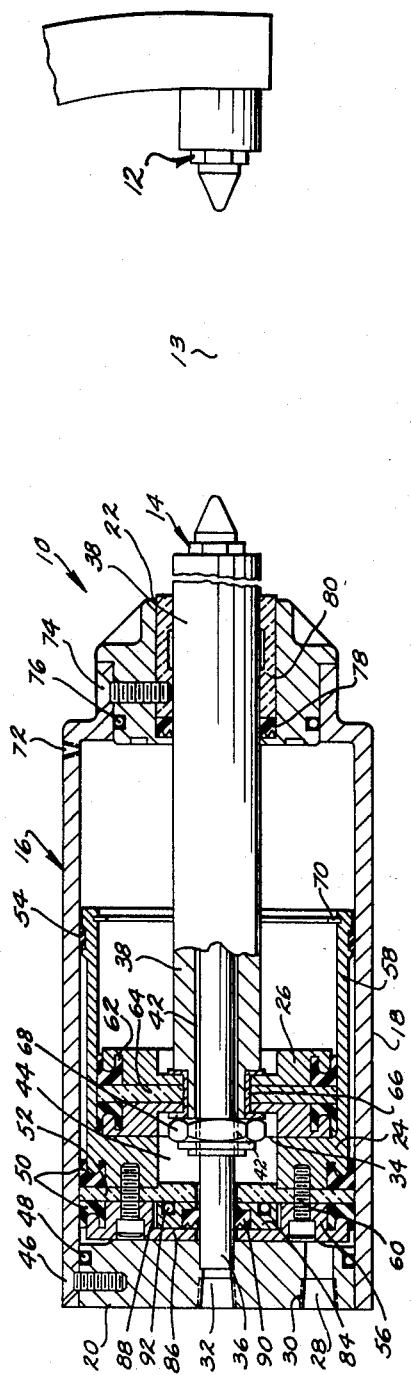
FIG. 1 is a sectional elevational view of a double piston motor utilized in resistance welding apparatus, including novel seal means.

Referring to FIG. 1, the welding apparatus 10 there depicted includes stationary welding electrode assembly 12, reciprocating electrode assembly 14 and motor or power cylinder assembly 16.

Fluid motor 16 comprises cylindrical housing 18, rear end cap 20, front end cap 22, rear piston 24, and front piston 26. In the housing and behind rear piston 24 is a pressurized fluid inlet 28. Suitable supply line conduits may be attached to this inlet 28 by threads 30. A second pressurized fluid inlet 32 is provided in the housing for front piston 26. To facilitate fluid contact with rear face 34 of piston 26, a conduit or tube 36 is affixed to end cap 20 and extends axially through piston 24 as shown. The length of tube 36 is determined by the forward movement of piston 24 in housing 18. Thus, it may extend into a fluid passageway in shaft 38 a substantial distance as shown. Pressurized fluid emerging from end 40 of tube 36 passes back through annular opening 42 around the tube and into chamber 44 for action on the rear face 34 of piston 26. This annular opening 42 extends between rod 38 and tube 36 clear to the rear terminal portion of rod 38 around which nut 68 is threaded.

To seal end cap 20 which is secured to housing cylinder 18 by bolts 46 or the like, an annular resilient seal 48 such as a conventional O-ring is used. End cap 22 is retained in the forward end of housing 18 by suitable bolts 74 and is sealed to housing 18 with a typical annular or O-ring seal 76. Cap 22 is in turn sealed to shaft 38 by suitable packing 78 adjacent alignment bushing 80 formed of any suitable material such as nylon. Rear piston 24 is sealingly associated with housing 18 with annular U-cups 50 retained in position by spacer 52 of a rigid material such as nylon. A forward seal 54 is provided between housing 18 and piston 24. Piston 24 is actually composed of a rear section 56 and a forward section 58 joined by suitable bolts 60 or the like. Section 58 defines or forms a cylinder within which forward piston 26 reciprocates. Piston 26 is sealingly engaged with this cylinder section 58 through U-cup seals 62 separated by spacer 64. The piston 26 is retained on shaft 38 by nut 68 but is electrically insulated therefrom by insulating ring 66. Retaining ring 70 determines the maximum forward position of piston 26 in piston 24. A third fluid port is provided in the forward end of housing 18 (or optionally in the end cap 22) to cause the rearward movement of the pistons.

Since piston 24 reciprocates in the housing, it slides axially back and forth on conduit 36. As normally manufactured, these motors are assembled with piston 24 not exactly co-axial with conduit 36 over its entire length, i.e. misalignment occurs at at least one point in the traverse. This misalignment occurs because of slight manufacturing errors in dimensions between any of the several joined members in the assembly. Thus, if end cap 20 is slightly askew with respect to housing 18, or if conduit 36 is not exactly co-axial with end cap 20 and thus housing 18, or if piston 24 is slightly askew with respect to conduit 36, or if shaft 38 is not perfectly co-axially aligned with the rear end of housing 18 because bushing 80 is not perfectly aligned with the entire housing, this causes the members of the assembly to be thrown out of alignment. Therefore, the axial orientation of piston 24 with respect to conduit 36 will vary as the piston shifts between the two ends of housing 18, which housing is usually of a substantial length. This shifting has heretofore forced the packing to compress tightly on one side of the conduit and draw away from the opposite side during the sliding movement to thereby cause leakage.

It has been found that a very effective seal may be obtained between the reciprocating piston 24 and the stationary conduit tubing 36, by providing a special gland 84 between flange 86 of piston 24 and spacer 52. The particular method of retaining gland 84 in place may be varied as long as radial movement is allowed as by space 88. This gland includes an annular recess on its inner peripheral face into which a packing 90 of a resilient annular sealing material is placed, and includes an annular recess on at least one axial face thereof into which an annular seal such as a resilient O-ring 92 is placed. This gland 84 is thus radially floatable to constantly provide a tight seal between piston 24 and conduit 36 even though these two members move out of their normally coaxial relationship as the piston reciprocates. This gland thus seals against exchange of air between chambers 104 and 44 even when a pressure differential exists. In some instances it is conceivable that the two seals may be combined into one on a corner of the gland.

Figure 2:
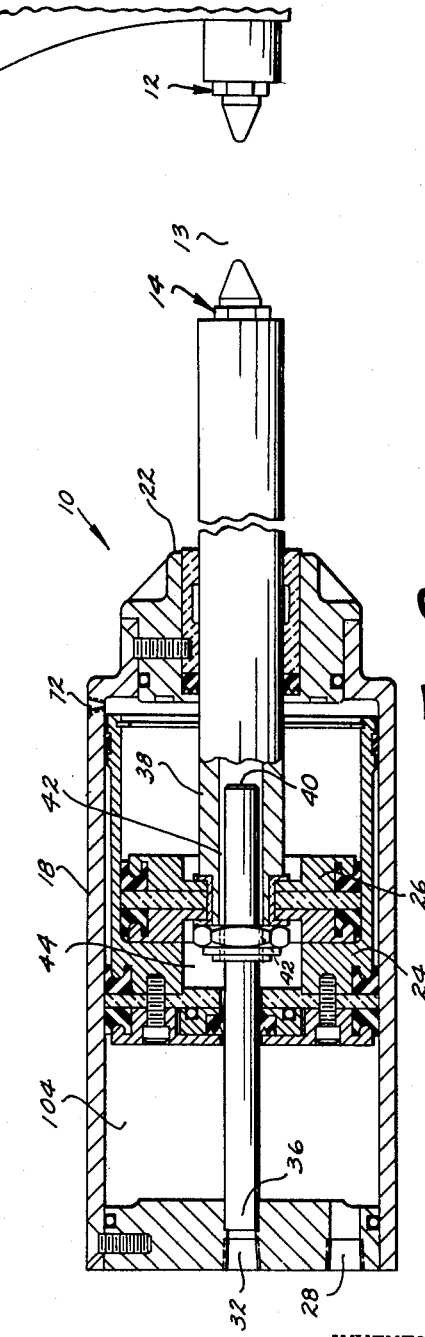
FIG. 2 is a sectional view of the motor showing both pistons in the partially extended position after actuation of the rear piston.

In operation, the motor passes through two successive operational stages. FIG. 1 depicts the motor in its completely retracted position. It is now desired to weld two pieces of metal together such as 100 and 102 in FIG. 3, electrode assemblies 12 and 14 must exactly close the gap 13 therebetween and be brought together with the proper predetermined amount of pressure. Since in welding items such as automobile doors, the peripheral portion of the door is substantially wider than the areas to be welded, the electrodes must be originally retractable to leave a space wide enough to encompass this wide door edge. However, it is not expedient to continue retracting the reciprocating electrode assembly to this distance when making a series of closely adjacent welds on a narrow inner portion of the door. Therefore, after the electrodes have traversed this wide door edge, compressed fluid such as air is introduced behind rear piston 24 into chamber 104 via inlet 28 to cause the entire double piston assembly to shift forward in the housing and thus partially close the gap 13 between the electrode assemblies as in FIG. 2. Then when it is desired to repeatedly weld the metal pieces at several adjacent spots, the reciprocating electrode assembly 14 oscillates by injecting air into inlet 32 through conduit 36, through opening 42 in shaft 38 and then into chamber 44 behind front piston 26 to cause it to shift forwardly to contact the metal parts as in FIG. 3. An electrical current is then passed between the electrodes to weld the pieces at one spot. Piston 26 is then retracted by introducing pressurized fluid through front inlet 72 while releasing the pressure in chamber 44, or by applying a negative pressure behind the piston through conduit 36 and inlet 32, as long as a pressure differential is obtained across the piston. Piston 26 is then repeatedly extended and retracted in adjacent spots.

It will be seen that during the initial extension, a tight seal must be maintained between piston 24 and conduit 36 to prevent pressurized fluid from passing from chamber 104 into chamber 44 when it is desired to maintain inner piston 26 in contact with the front face of outer and rear piston 24 since it is desired to shift the entire assembly as a unit. Any leakage into chamber 44 will cause an extension of piston 26 to thereby defeat pre-set electrode pressure control and distance settings. Further, when actuating only the front piston, it is not desirable to leak fluid to the rear piston chamber.

In addition to causing these problems, leakage also necessitates additional pressure lines and control valves. This is because the total force exerted against the face of the front piston to shift it independently must be less than the total force against the face of the rear piston to prevent rearward creeping of the rear piston. It has heretofore been necessary to provide two independent pressure lines and control valves so that the fluid is introduced to the rear chamber at a higher pressure than the front even though the front piston has a slightly smaller face area (moving force equals pressure times area), since leakage caused fluid passage from the rear to the front chambers.

The novel gland 84 (depicted most clearly in FIG. 4) effectuates a completely tight seal, on the other hand, even when conduit 36 and piston 24 do not remain perfectly co-axially aligned. It floats radially to continuously seal tightly against the piston 24 by virtue of packing 92 even when the piston shifts axially on the conduit, but remains tightly sealed against the conduit 36 by virtue of seal 90. This is true because both of these are sealingly slidable on their adjacent contacting surfaces. This tight dependable seal allows accurate electrode pressure and distant setting control since it forestalls creeping of one piston while extending the other. Thus when activating only the rear piston to extend the double piston assembly as a unit with both pistons in contact with each other, the pressurized fluid will not seep from chamber 104 into chamber 44 to cause the front piston to extend. Also, it enables the effective use of the small differential in piston face areas to be used in making the force on the front piston less than on the rear. This makes possible the use of a simple pressure line from a common source as depicted schematically in FIG. 5. Piston chambers 44 and 104 are there shown connected to secondary supply lines 112 and 114 joined to common source 110. Valves 116 and 118 control the inlet and exhaust of fluid to the piston chambers to actuate the motor against metal to be welded. Since the area of rear face of piston 26 is slightly smaller than the area of rear face of piston 24, and since no leakage now occurs between the chambers, the total force exerted against the rear piston will be greater than that against the front piston when the fluid under a common pressure is introduced therein. Therefore, the rear piston will remain steady when the front piston is extended independently.

Of course various obvious modifications may be made in the motor structure disclosed without departing from the scope of the invention as long as the gland assembly is retained in its essential nature. The scope of the protection is therefore not intended to be limited to this illustrative material but only by the scope of the appended claims and the equivalent structures thereto.

We claim:
1. A fluid motor comprising, a housing including end caps; a piston reciprocable in said housing; a tubular conduit affixed to one end cap of said housing and extending axially through said piston to supply fluid to the space on one side thereof; and a rigid floating sealing gland between said piston and said conduit; said gland containing a resilient annular seal to seal said gland to said conduit, and a resilient annular seal to seal said gland to said piston; said seals being in sliding contact with the adjacent surfaces to assure a leak-proof seal even though said piston is misaligned with respect to said conduit.

2. A fluid motor comprising a cylindrical housing; a first reciprocable piston in said housing; a second reciprocable piston adjacent the front portion of said first piston; pressurized fluid conduit means extending axially through said first piston to allow fluid contact with said second piston; and a rigid floating gland between said piston and said conduit; said gland containing a resilient radially positioned annular seal to seal said gland to said conduit, and a resilient axially positioned annular seal to seal said gland to said piston; said seals being in sliding contact with the adjacent surfaces to assure a leak-proof seal even though said piston is misaligned with respect to said conduit.

3. A fluid motor comprising a cylindrical housing; a first reciprocable piston in said housing; a second reciprocable piston adjacent the front portion of said first piston; a pressurized fluid conduit means extending axially through said first piston to allow fluid contact with said second piston; and a rigid floating gland between said first piston and said conduit; said gland having an annular recess in at least one axial face thereof and having an annular recess in the inner peripheral face thereof; resilient sealing means in said annular recesses and in sliding contact with the adjacent surfaces to provide a leak-proof seal even though said piston is misaligned with respect to said conduit.

4. Fluid motor apparatus comprising a fluid motor and fluid conduit means; said motor comprising a cylindrical housing; a first reciprocable piston in said housing; a first fluid inlet behind said piston to allow fluid contact with the rear face thereof; the front portion of said piston forming a second cylinder; a second piston in said second cylinder and reciprocable therein; a second fluid inlet means behind said first piston, said second inlet means including a section of tubing affixed to said housing and extending axially through said first piston to allow fluid contact with the rear of said second piston; and a rigid floating gland between said piston and said conduit; said gland containing a resilient radially positioned annular seal to seal said gland to said conduit, and a resilient axially positioned annular seal to seal said gland to said piston; said seals being in sliding contact with the adjacent surfaces to assure a leakproof seal even though said piston is misaligned with respect to said conduit; said conduit means comprising a primary fluid supply line; a first secondary supply line between said primary line and said first fluid inlet; a second secondary supply line extending between said primary line and said second inlet means, and valve in each of said secondary lines to control the presence of a fluid under one predetermined pressure adjacent said pistons.

References Cited in the file of this patent

UNITED STATES PATENTS

| | | |
|---|---|---|
| 601,082 | Potter | Mar. 22, 1898 |
| 1,039,448 | Schwarz | Sept. 24, 1912 |
| 2,307,067 | Paulus | Jan. 5, 1943 |
| 2,517,153 | Wood | Aug. 1, 1950 |
| 2,742,306 | Kelso et al. | Apr. 17, 1956 |

FOREIGN PATENTS

| | | |
|---|---|---|
| 625,711 | Great Britain | July 1, 1949 |
| 705,403 | Great Britain | Mar. 10, 1954 |
| 743,603 | Great Britain | Jan. 18, 1956 |